United States Patent

Gooch et al.

[11] Patent Number: 5,848,955
[45] Date of Patent: Dec. 15, 1998

[54] MUSCLE POWERED THERAPEUTIC VEHICULAR SYSTEM

[75] Inventors: Judith L. Gooch; Donald Bloswick; Don R. Brown; Glade Howell, all of Salt Lake City; Jeff W. Bean, Kaysville, all of Utah

[73] Assignee: University of Utah Research Foundation, Salt Lake City, Utah

[21] Appl. No.: 740,524

[22] Filed: Nov. 4, 1996

Related U.S. Application Data

[63] Continuation-in-part of Ser. No. 376,128, Jan. 19, 1995, Pat. No. 5,501,476, which is a continuation of Ser. No. 888,724, May 26, 1992, abandoned.

[51] Int. Cl.$^6$ .............................. A63B 23/04; B62M 1/20
[52] U.S. Cl. ................................ 482/57; 601/36
[58] Field of Search .................... 482/57, 51, 66, 482/68, 148; 601/23, 34, 35, 36, 24; 280/47.41, 62, 229, 250.1, 266, 32.7

[56] References Cited

U.S. PATENT DOCUMENTS

| | | |
|---|---|---|
| 343,165 | 6/1886 | Fay . |
| 377,869 | 4/1888 | Stillman . |
| 636,222 | 10/1899 | Killen . |
| 839,976 | 1/1907 | Yale . |
| 1,383,070 | 7/1921 | Bukolt . |
| 1,574,843 | 3/1926 | Nowak et al. . |
| 1,704,068 | 3/1929 | Wolfe . |
| 1,763,250 | 6/1930 | Nettles . |
| 1,772,794 | 8/1930 | Arney . |
| 1,939,989 | 12/1933 | Kopsco . |
| 3,744,794 | 7/1973 | Gause et al. ............................. 482/57 |
| 3,850,353 | 11/1974 | Foulds . |
| 4,351,406 | 9/1982 | Lay . |
| 4,402,502 | 9/1983 | Peters ......................................... 601/36 |
| 4,466,660 | 8/1984 | Mabie . |
| 4,619,462 | 10/1986 | Shaffer et al. . |
| 4,664,400 | 5/1987 | Date ......................................... 280/230 |
| 4,673,190 | 6/1987 | Ahlberg . |
| 4,746,135 | 5/1988 | Oh . |
| 4,761,013 | 8/1988 | Dowton . |
| 4,779,882 | 10/1988 | Date ......................................... 482/57 |
| 4,867,441 | 9/1989 | Blakeman . |
| 4,909,526 | 3/1990 | Vazin . |
| 5,005,825 | 4/1991 | Fogel . |
| 5,501,476 | 3/1996 | Howell et al. . |

FOREIGN PATENT DOCUMENTS

| | | |
|---|---|---|
| 0398350 | 12/1988 | Belgium . |
| 0896837 | 3/1945 | France . |
| 0081199 | 5/1895 | Germany . |

*Primary Examiner*—Stephen R. Crow
*Attorney, Agent, or Firm*—Thorpe, North & Western, L.L.P.

[57] ABSTRACT

A therapeutic system particularly suited for strengthening the hip extensor muscles of a user is described. The vehicle combines the therapeutic benefits of conditioning the hip extensor muscles with the enjoyable activity of propelling oneself on a wheeled vehicle. A frame is provided following the general pattern of a tricycle with one steerable wheel and a pair of driving wheels. A seat, a back rest, and at least one strap for holding the user in position on the seat and the back rest are also provided. These user support structures securely hold the user in the proper operating position, even when the user has less than normal muscular control and strength, such as with children with cerebral palsy. Structures are included for receiving at least a portion of the user's leg between the user's knee and the user's hip and for transmitting the extension motion of the user's hips into the rotational movement of the pair of driving wheels. Substantially only the hip extensor group of muscles of the user are used to propel the vehicle.

11 Claims, 3 Drawing Sheets

MUSCLE POWERED THERAPEUTIC VEHICULAR SYSTEM

This application is a continuation in part of Ser. No. 08/376,128 filed Jan. 19,1995 now U.S. Pat. No. 5,501,476 which is a continuation of Ser. No. 07/888,724 filed May 26,1992, now abandoned.

BACKGROUND

1. The Field of the Invention.

This invention relates to human powered vehicles. More particularly, the present invention relates to therapeutic devices which are used to provide conditioning of specific muscles of the human body.

2. The Prior Art.

The benefits of muscle powered activities are universally recognized. For example, the physiological benefits of pedaling a muscle powered wheeled vehicle, such as a bicycle or a tricycle, are well known. Unfortunately, some who need the benefits of such exercise the most are unable to use previously available bicycles and even tricycles.

In particular, children afflicted with cerebral palsy are generally unable to operate any of the previously available tricycles which are enjoyed by other children. Moreover, both adults and children may be afflicted with other disorders which make operating previously available bicycles and tricycles difficult or impossible. For example, many adults suffer from deterioration of the knee joint and cannot participate in exercises requiring movement of the knee joint. Thus, such persons are denied the benefits which accrue from such activities.

In particular, it is often the case that a person lacks either the muscle strength or coordination in the hip extensor muscles. Hip extensor muscles are critical for walking since they prevent trunk flexion and collapse. The hip extensor muscles are one of the major support muscles of the body used in standing and walking. Weakness of the hip extensor muscles cannot be treated with external bracing as is often the case with more distal muscles.

Moreover, in children with cerebral palsy who have undergone the selective dorsal rhizotomy procedure to reduce spasticity, hip extensor muscle weakness is frequently very pronounced. It is often the case that physical therapists work extensively (often for years) to strengthen these muscles in children with cerebral palsy. As a general rule, it is very difficult to strengthen muscles in children; they refuse to lift weights. However, children will ride tricycles. Disadvantageously, a conventional tricycle does not strengthen the hip extensor muscles; it primarily strengthens the quadriceps muscles.

Even though it has been known for a long time that many persons, including children with cerebral palsy, are unable operate previously available tricycles, the problem of providing a muscle powered vehicle which can be operated by persons with particular disorders, and which will benefit such persons, has been unrecognized. Thus, in view of the inability of many individuals, for example children with cerebral palsy, to operate previously available bicycles and tricycles, it would be an advance in the art to provide a muscle powered wheeled vehicle which can be used by such individuals and which provides therapeutic conditioning to the hip extensor muscles.

BRIEF SUMMARY AND OBJECTS OF THE INVENTION

In view of the above described state of the art, the present invention seeks to realize the following objects and advantages.

It is a primary object of the present invention to provide a wheeled apparatus which can be powered by a person with impaired muscle control.

It is yet another object of the present invention to provide a muscle powered wheeled vehicle which can be operated by a child afflicted with cerebral palsy.

It is another object of the present invention to provide a muscle powered wheeled vehicle which will promote improvement in the walking gait of children with cerebral palsy.

It is a further object of the present invention to provide a muscle powered wheeled vehicle which promotes activation of the hip extensor muscles in a similar or greater amount than walking.

It is also another object of the present invention to provide system for measuring the strength and conditioning of a person using the hip extensor muscles.

The present invention provides a therapeutic exercise system particularly suited for strengthening the hip extensor muscles of a user. The present invention combines the therapeutic benefits of conditioning the hip extensor muscles with the enjoyable activity of propelling oneself on a wheeled vehicle. Children, particularly those with disorders such as cerebral palsy, benefit from the present invention.

In accordance with one aspect of the present invention, some presently preferred embodiments of the invention include a frame which is preferably constructed using materials and techniques similar to those used in bicycle and tricycle construction. One preferred embodiment of the present invention follows the general pattern of a tricycle having one steerable wheel and a handlebar connected to the frame and a pair of driving wheels connected to the rear of the frame.

A seat, a back rest, and at least one strap for holding the user in position on the seat and the back rest are also provided. These user support structures securely hold the user in the proper upright operating position, even when the user has less than normal muscular control and strength.

Importantly, the present invention includes means for receiving at least a portion of the user's leg between the user's knee and the user's hip preferably including means for receiving the back of the user's thigh. The present invention also includes means for transmitting the reciprocating movement of the user's hip into the rotational movement of the driving wheel or wheels such that the vehicle can be propelled by the hip movement of the user. The desired hip movement of the user is extension of the hip joint. In the preferred embodiment of the present invention, one or both of the user's legs are coupled to the driving wheels such that as the hip joints are alternately moved to extend the legs of the user the vehicle is propelled. Substantially only the hip extensor group of muscles are used to propel the vehicle thus providing conditioning for that specific group of muscles.

In accordance with another aspect of the present invention, a second embodiment of the present invention is provided. The second embodiment shares the same features of holding the user in place while utilizing the hip extensor group of muscles. Preferably included in the stationary embodiment is a means for providing resistance to the hip extensor movements made by the user. The means for providing resistance can preferably comprise electromechanical devices which are adjustable to impose differing amounts of resistance. Also provided are means for sensing the resistance imposed and means for measuring the velocity obtained by the user. A processor means is provided to analyze the information obtained about the performance of the user and output one or more performance parameters. A means for displaying the performance parameters is also provided to provide a perceptible indication of the user's performance.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 1:
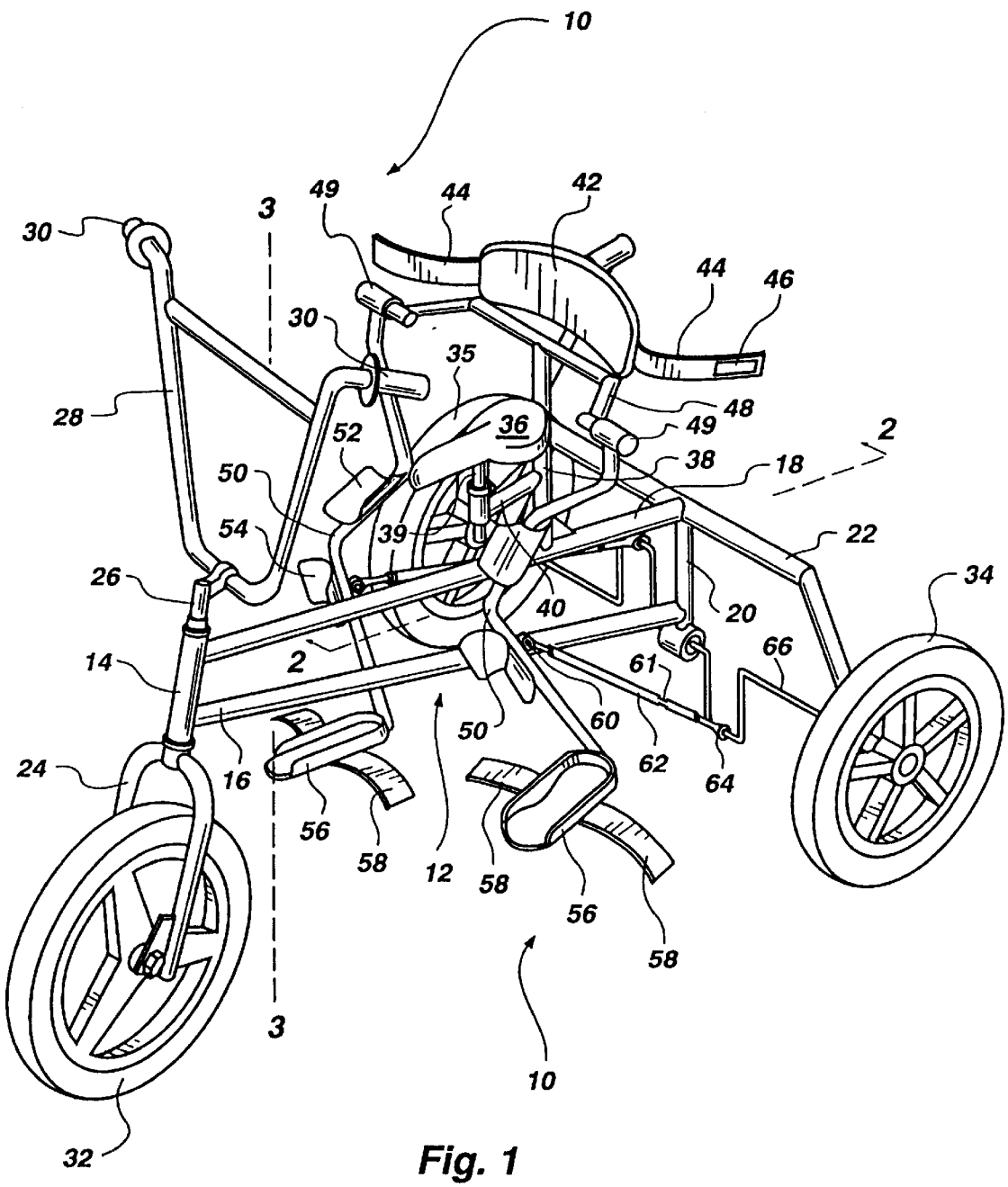
FIG. 1 is a perspective view of the first presently preferred embodiment of the therapeutic vehicle of the present invention.

FIG. 1 provides a perspective view of the presently preferred example of the therapeutic vehicle of the present invention. The described embodiments are particularly suited for use by children with cerebral palsy but can be beneficially used by any person, for example persons who do not have full function of their knee joints. Those skilled in the art will appreciate that the present invention has application with persons other than children and with disorders other than cerebral palsy. Still, the illustrated therapeutic vehicle and the accompanying vehicular system will be described herein as being used with children having cerebral palsy with the understanding that the teachings provided herein can readily be used to provide therapeutic vehicles to benefit others.

As mentioned, children with cerebral palsy generally have deficient strength and control in the group of muscles used to extend the hip joint. The group of muscles involved in the extension motion of the hip principally includes the gluteus maxcimus muscle as well as, to a lesser extent, the biceps femoris, the semitendinosus, and the semimembranosus muscles which will collectively be referred to herein as the "hip extensor muscles."

Since the hip extensor muscles are critical to having a proper walking gait, these muscles must be developed in order for a child to walk properly. Unfortunately, children are notoriously uncooperative when required to engage in therapeutic exercise per se. With the therapeutic vehicle of the present invention, the hip extensor muscles are generally activated to a greater extent than with other modes of therapy suitable for children and the children find operating the vehicle to be an enjoyable activity. Thus, the child obtains the benefit of the therapeutic hip extensor muscle action while enjoying a common childhood activity which could not otherwise be enjoyed.

The therapeutic vehicle, generally represented at 10 in the figures, includes a frame, generally indicated at 12, and three wheels 32, 34, and 35, a handlebar 28, a seat 36, and drive components which will be described in detail later. The size of the seat 36 should be selected to provide the least restriction of the user's hip extension motion. Importantly, the vehicle 10 is configured as a three wheel tricycle to ensure a proper amount of stability and safety for the user. It is, however, within the scope of the present invention to use only two wheels, or more than three wheels, in some embodiments of the present invention.

The frame 12 is preferably constructed using techniques used to construct bicycle frames. The frame 12 of the illustrated vehicle 10 includes a top tube 18, a rear driving wheel tube 22, a hanger tube 20, a down tube 16 and a head tube 14. The particular frame geometry illustrated in the figures is preferred but many other frame geometries and types of frame-like structures can be used within the scope of the present invention.

The front wheel 32 is attached to a fork 24 which is rotatably mounted in the head tube 14 preferably using bearing structures (not represented in the figures) available in the art. A stem 26 connects the handle bar 28 to the fork 24. It is within the scope of the present invention to also utilize a stem which allows the handle bar 28 to be adjustably moved closer to, or farther away from, the seat 36. The handle bar 28 is provided with grips 30 as is known in the art. If desired, it may be beneficial to include grips 30 on the handle bar 28 which are oriented more vertically than those represented in FIG. 1. The front wheel and the components associated with it are used to steer the therapeutic vehicle 10. As will be appreciated by those skilled in the art, these structures can be fabricated using components and techniques known in the art or one skilled in the appropriate art can take advantage of other components and techniques which would be suitable for fabrication of an embodiment of the present invention.

The illustrated therapeutic vehicle 10 includes two rear driving wheels 34 and 35, which, as in the case of the front wheel 32, preferably are of the type generally used in the bicycle and tricycle art. The rear driving wheels 34 and 35 are connected to an axle 66 which is connected to the frame 12 by way of bearing member 67, as shown best in FIG. 3. As will now be explained, the axle 66 is coupled to the legs of the user (not represented in the figures) so that the action of the hip extensor muscles alone will propel the therapeutic vehicle 10 thereby providing conditioning to said group of muscles. If desired, a brake system can be included on the embodiments disclosed herein. For example, a locking brake system can be included to present the embodiment represented in FIGS. 1–3 from moving while the user is mounting or dismounting. Those skilled in the pertinent arts can select a brake system from those available in the industry or make any necessary modifications thereto.

As mentioned, the illustrated therapeutic vehicle 10 is particularly intended for use by children having cerebral palsy who, in order to obtain maximum benefit from the present invention, require support structures to keep their body in position as they use their hip extensor muscles to propel the therapeutic vehicle 10. In order to provide such support, a seat 36 and a back rest 42 are provided in the illustrated therapeutic vehicle 10. In order to transmit the action of the hip extensor muscles to the rear driving wheels 34 and 35, a crank 50 is provided for each leg of the user. Each of the cranks 50 hang from pivots 49 as will be explained more fully shortly.

Figure 2:
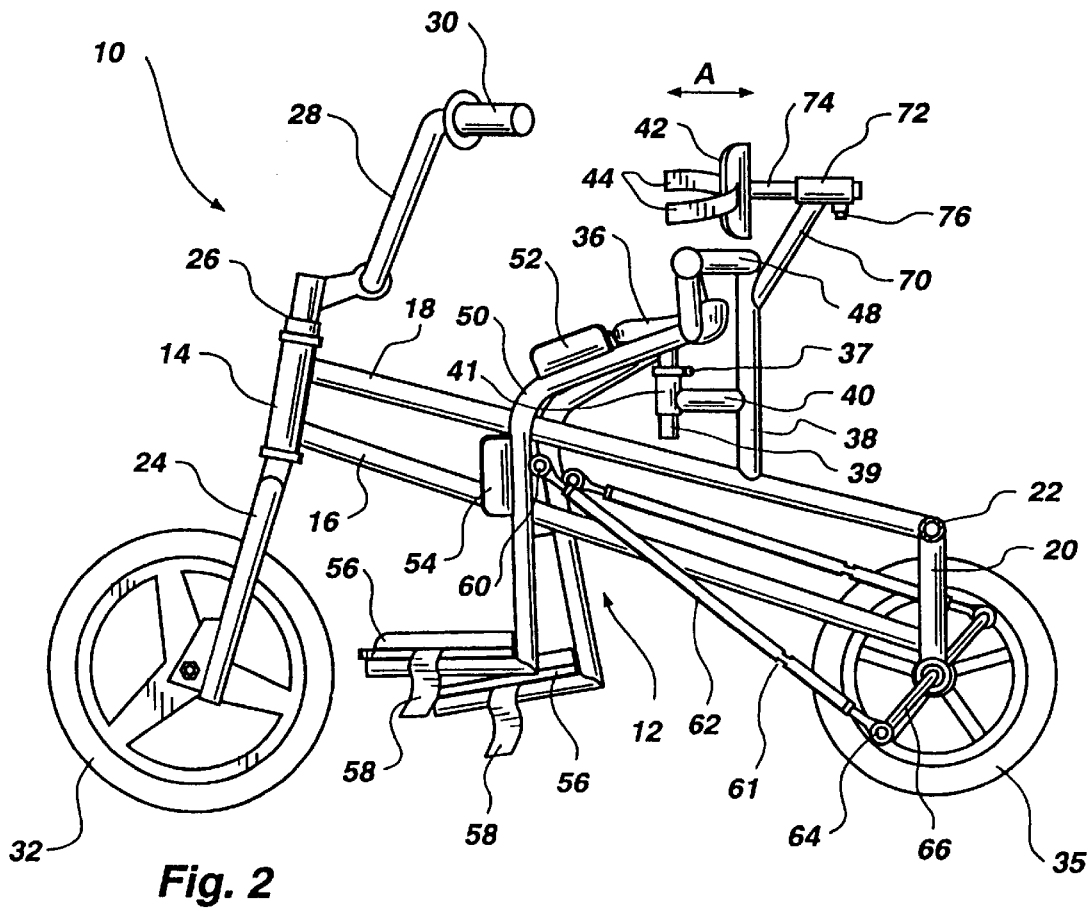
FIG. 2 is a cross sectional view of the therapeutic vehicle taken along line 2—2 of FIG. 1.

As shown best in FIG. 2, a seat 36 is provided to give vertical support to the user. The seat 36 is connected to a seat post 39 which can be locked into a vertical position using a locking bolt 37. A seat arm 40 is connected to a support tube 38 which is connected to the top tube 18 of the frame. The seat post 39 slides vertically within a sleeve 41 until the locking bolt 37 is tightened.

Figure 3:
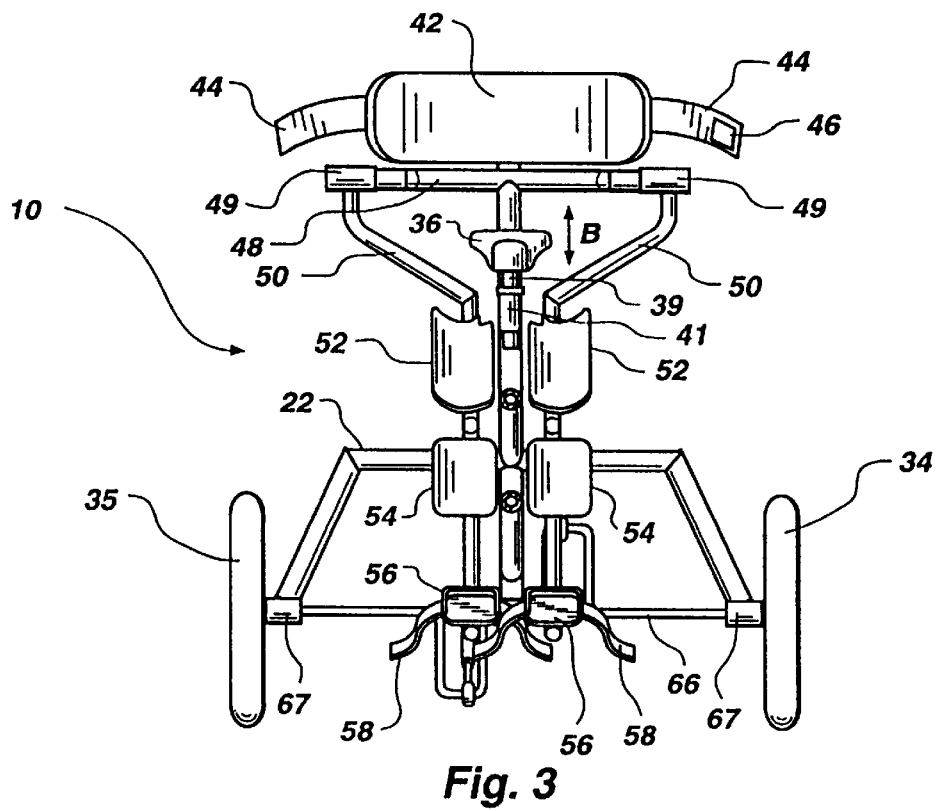
FIG. 3 is a cross sectional view of the therapeutic vehicle taken along line 3—3 of FIG. 1.

Referring now to FIG. 3, for best results, the height of the seat 36 should be adjusted in the direction of arrow B so that the hip joints of the user are at the same height as the crank pivots 49. Thus, lining up the crank pivots 49 approximately with the acetabulum, slightly above the greater trochanter of the hip, will generally be satisfactory. Other positions, however, may also be used as determined by experience with users of the therapeutic vehicle 10.

Referring now to the side view of FIG. 2, the back rest 42 is also provided to keep the user in the proper upright position. Also included is a strap 44 which wraps around the torso of the user and keeps the back of the user against the back rest 42. As can be seen best in FIG. 1, the back rest preferably has a curved shape to cradle the user's torso. The strap 44 is preferably provided with lengths of hook and pile fastener (one patch of which is represented at 46) to hold the strap together around the user. A buckle or some other type of fastener can be used on the strap 44 in place of the preferred hook and pile fastener 46.

As illustrated best in FIG. 2, the back rest 42 can be moved forward and backward in the direction of arrow A. The back rest 42 is attached to a back rest post 74 which passes through a sleeve 72. A locking bolt 76 positioned on the sleeve 72 holds the back rest 42 in position when tightened. A strut 70 connects the sleeve 72 to the support tube 38. While use of the user support structures described herein is preferred, other arrangements may also be used within the scope of the present invention. Furthermore, it is within the scope of the present invention to orient the user in positions other than the described upright position.

While being securely held in the proper position, the user can propel the therapeutic vehicle by using substantially just the hip extensor muscles. The drive train components, which will now be described in detail, function to couple the movement of the hip extensor muscles to the driving wheels 34 and 35. As will be appreciated, the drive train components used in embodiments of the present invention should provide support for the legs of the user so that primarily the hip extensor muscles are used and lack of strength or coordination in other muscles does not hinder the use of the present invention. It is also within the scope of the present invention to provide structures to orient the user so that the hip extension motion of the user more precisely mimics the hip extension motion during walking. For example, the user can be oriented in a forward leaning position. To facilitate assuming such a forward leaning position, a support upon which the front of the user's body can rest can also be preferably provided. It is also within the scope of the present invention to also alter the position of the cranks 50 and pivots 49 to maintain the optimum relationship between these structures and the user.

As illustrated best in FIG. 1, the cranks 50 are shaped so that as the user's leg is rested thereupon the knee of the user is comfortably bent. A thigh support 52 is included on the crank 50 and receives the back of the user's thigh. A calf support 54 is also provided on the crank 50 to hold the user's calf in place. A foot rest 56 receives the user's foot and a strap 58, which can be provided with some type of fastener such as a hook and pile fastener, holds the user's foot in place. Similarly, if desired, the thigh support 52 and the calf support 54 can also be provided with straps to hold the user's legs in place.

A first connecting rod extension 60 is pivotally connected to each of the cranks 50. Each of the connecting rod extensions 60 are attached to a connecting rod 62 which is in turn joined to a second connecting rod extension 64 which is rotationally connected to the eccentric portion of the axle 66.

Preferably, the effective length of the connecting rod 62 can be altered to increase or decrease the mechanical leverage provided between the cranks 50 and the axle 66. It is also within the scope of the present invention to provide a friction brake on one or more of the wheels 32, 34 and 35, or on the axle 66 or other structure in order to provide additional mechanical resistance to the propulsion of the therapeutic vehicle or to limit the speed thereof.

In the described therapeutic vehicle 10, the connecting rod 62 is provided with internal threads (not shown) which are engaged by external threads (not shown) provided on the first connecting rod extension 60 and the second connecting rod extension 64 and which allow the combined length of these structures to be increased or decreased by rotating the rod 62. A flat 61 is provided on the rod 62 to allow the rod to be gripped by a wrench and turned. Other structures can also be used, such as a turn buckle (not represented), to alter the length of the structures connecting the cranks 50 to the axle 66. It will be appreciated that it is also within the scope of the present invention to provide structures which allow changing the position at which a structure corresponding to the first connecting rod extension 60 is joined to the crank 50 or the changing eccentricity of the eccentric portion of the axle 66. Moreover, while the illustrated structure is preferred, it is within the scope of the present invention to use completely different arrangements to couple the movement of the user's hip extensor muscles to the driving wheels. As will now be appreciated, using the structure represented in the figures, as the user alternately activates his left side and right side hip extensor muscles, the cranks 50 will alternately pivot resulting in the rotation of the rear driving wheels 34 and 35.

Figure 4:
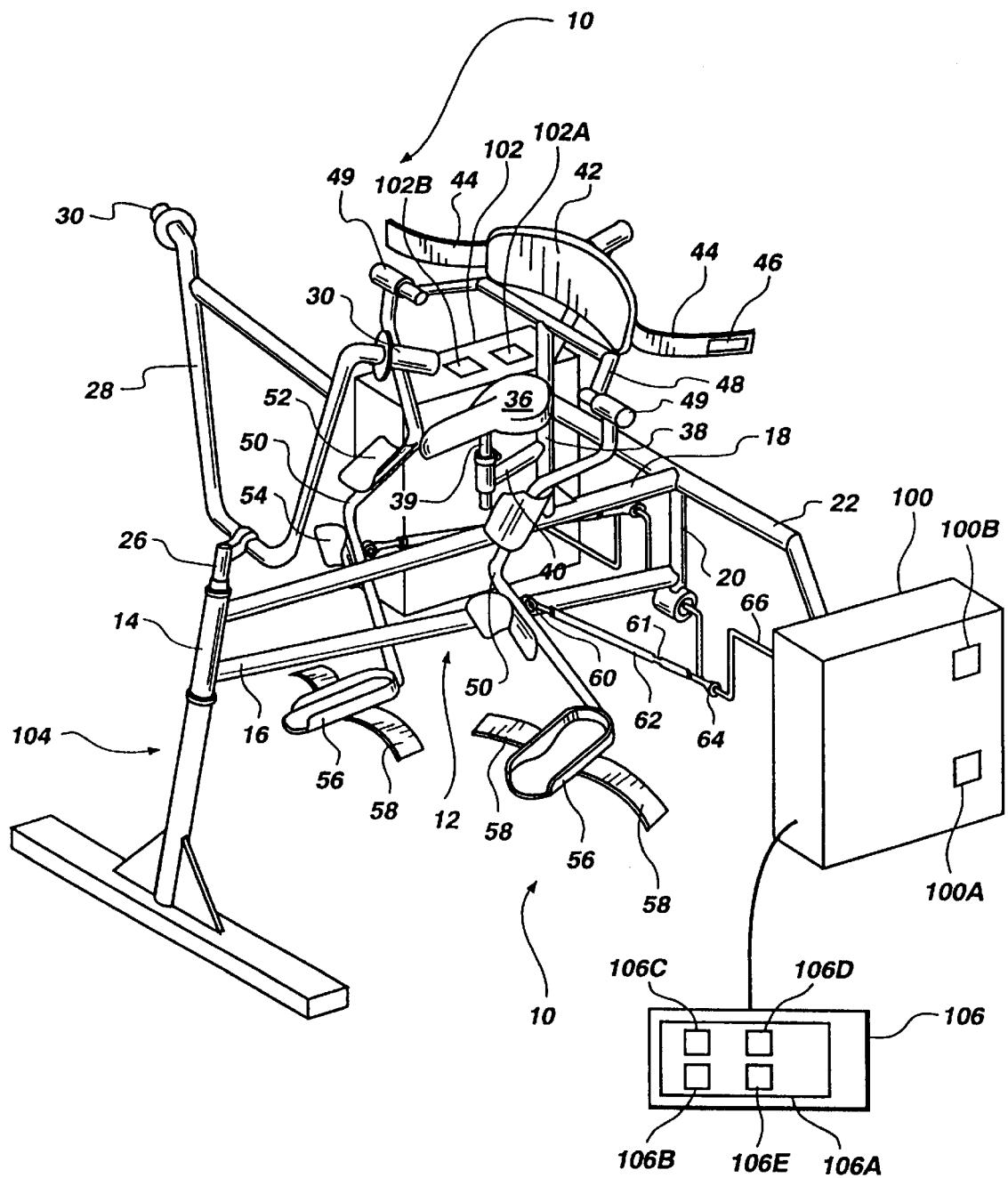
FIG. 4 is a perspective view of the second presently preferred embodiment of the therapeutic vehicular system of the present invention.

Reference will next be made to FIG. 4 which is a perspective view of a second presently preferred embodiment of the present invention. The system represented in FIG. 4 is a stationary device which is particularly suited for providing exercise and carrying out performance measurements of both children and adults. It will be appreciated that many of the structures represented in FIGS. 1–3 are also included in the embodiment of FIG. 4 and thus only those structure which differ from those previously described structures will be explained.

The embodiment of FIG. 4 is provided with a front support which is generally indicated at 104. The front support can be fabricated as an integral part of the frame or can be fabricated as merely a replacement for the front wheel 32 represented in FIGS. 1–3. The front support 104 can be fabricated in accordance with the considerations used when fabricating the frame as previously described.

Also included in the embodiment of FIG. 4 are a pair of axle supports which are schematically represented at 100 and 102. The axle supports 100 and 102 can be fabricated in accordance with the same considerations used to fabricate the embodiments represented in FIGS. 1–3. The axle supports 100 and 102 include structures which rotationally support the axle 66 so that the action of the hip extensor muscles can result in the rotation of the axle. It is also within the scope of the present invention to provide an upper body exercise structure in the system. For example, the handlebar 28 can be pivotally fixed to the frame using a resistance providing device so that the user can move the handlebar in a reciprocating back and forth action to exercise the user's upper body.

Also included in the axle supports 100 and 102 are resistance providing structures 100A and 102A. The resistance providing structures 100A and 102A provide resistance to the rotation of the axle 66 and thus provide resistance to the movement of the user's hip extensor muscles. The resistance providing structures can preferably be friction devices as known to those skilled in the art. More preferably, the resistance providing devices 100A and 102A are electro-mechanical devices wherein the resistance provided can be adjusted to one of at least three or more resistance levels. The resistance providing devices 100A and 102A can preferably be electromagnetic devices which provide variable resistance in accordance with an electrical signal input thereto.

A processor unit 106 is preferably provided and connected to the axle supports 100 and 102 and to the resistance providing devices 100A and 102A. The processor unit 106 preferably generates commands sent to the resistance providing devices 100A and 102A in accordance with the information input via a user interface 106A. The user interface 106A preferably includes a keyboard 106B or a key pad, a visual display 106C, a printer 106D, and an audio output device 106E.

The processor unit 106 preferably includes a processor as is well-known in the industry as well as other components which can be readily selected by those skilled in the industry. The processor unit 106 can be programmed or wired to control the resistance providing devices 100A and 102A to perform any desired sequence of exercise.

The axle supports 100 and 102 also preferably include sensor devices 100B and 102B which sense the rotation of the axle. The sensor devices 100B and 102B send data to the processor unit 106. With the processor unit 106 generating commands for the resistance imposing devices 100A and 102A, and receiving data from the sensor devices 100B and 102B, the processor unit 106 can calculate and convey to a attending person at least one performance parameter showing the exercise performance of the user. Such performance parameters can preferably include parameters such as: the equivalent speed caused by the movement of the user; the equivalent distance traveled caused by the movement of the user; the strength of the user's hip extensor muscle group; the calories employed by the user; and the torque applied by the movement of the user. Calculating one or more performance parameters allows the progress of a user to be objectively determined and compared from one exercise session to another. For example, a child can regularly ride the embodiment represented in FIGS. 1–3 and the child's performance parameters, such as strength and endurance, can be periodically measured using the embodiment of FIG. 4. Significantly, the features represented in FIG. 4 can be combined with the other features represented in FIGS. 1–3 and described herein as can be arrived at by those skilled in the art.

Still further, it is within the scope of the present invention for the resistance providing structures 100A and 102A and the processor unit 106 to provide additional exercise routines. For example, it is within the scope of the present invention to impose a low resistance against the hip extensor movement of the user thus allowing the user to achieve a relatively high velocity. Alternatively, a high resistance can be imposed against the hip extensor movement of the user so that the user is limited to a relatively low velocity of the legs.

By utilizing different exercise routines, the visual display 106C can be programmed to indicate the work which is being accomplished by the user, one definition of work being force applied by the user multiplied by the equivalent distance which is, or would be, traveled. Another preferred definition of work is the force exerted on the thigh support 52, the crank 50, the calf support 54, and the foot rest 56 multiplied by the distance which these structures move. Another performance parameter which the display 106C is preferably programmed to provide is energy expended by the user, one preferred definition of energy expended being force multiplied by velocity. Most importantly, the performance parameters which measure the work performed, or energy exerted, by the user should be calculated by the processor unit 106 so that improvements in the user's condition over time can be objectively measured. It will be appreciated that those skilled in the industry can readily arrive at numerous arraignments of these described structures to provide the discussed features using components available in the industry.

In view of the foregoing, it will be appreciated that the present invention provides a muscle powered wheeled vehicle which can be readily operated by a child afflicted with cerebral palsy and which conditions the hip extensor muscles as it is used. The strengthening of the hip extensor muscles provided by the present invention promotes improvement in the walking gait of children with cerebral palsy and others as well. The present invention also provides a therapeutic vehicle which promotes activation of the hip extensor muscles in a similar or greater amount than walking and which is often more productive than other types of therapy. The present invention also allows the strength and conditioning performance of the user to be measured.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A vehicular exercise system for operation by a user which is positioned thereon, including users with less than normal muscular control and strength, the system comprising:

a frame;

user support means for supporting the user on the frame;

means for receiving at least a portion of the user's thigh at a position on the user's leg between the user's knee and the user's hip, the means for receiving at least a portion of the user's thigh comprising means for receiving the back of the user's thigh such that contact with the back of the user's thigh is made and the means for receiving the back of the user's thigh is moved by the hip extension motion of the user;

means for pivotally connecting, positioned at a point in substantial alignment with the user's hip, the means for receiving at least a portion of the user's thigh to the frame at a point in substantial alignment with the user's hip;

an axle, the axle having an eccentric portion thereof, rotationally supported on the frame;

resistance means for providing at least a primary resistance to the extension motion of the user's hip; and transmission means for transmitting the extension motion of the user's hip into the rotational movement of the axle, the transmission means including a connection between means for receiving at least a portion of the user's thigh comprising means for connecting the back of the user's thigh and the eccentric portion of the axle, such that the hip extension motion of the user is exerted against at least the primary resistance.

2. A system as defined in claim 1 wherein the resistance means selectively provides at least a primary resistance, a secondary resistance, and a tertiary resistance.

3. A system as defined in claim 1 wherein the resistance means comprises an adjustable electro-mechanical resistance providing device.

4. A system as defined in claim 1 further comprising:

sensor means for sensing the rotation of the axle;

processor means, coupled to the sensor means, for calculating at least one performance parameter of the user; and display means for providing a visually perceptible indication of the at least one performance parameter.

5. A system as defined in claim 4 wherein the processor means is coupled to the resistance means, and the resistance means provides a primary resistance and a plurality of additional resistances and wherein the processor means controls the resistance means.

6. A system as defined in claim 5 wherein the processor means calculates a plurality of performance parameters, the plurality of performance parameters selected from the group comprising:

equivalent speed caused by the movement of the user;

equivalent distance traveled caused by the movement of the user; and torque applied by the movement of the user.

7. A system as defined in claim 1 wherein the frame comprises:

a top tube;

a down tube; and a head tube.

8. A system as defined in claim 1 wherein the user support means comprises:

a seat;

means for selecting a vertical height for the seat;

a back rest;

means for selecting a horizontal position for the back rest; and a strap positioned on the back rest.

9. A system as defined in claim 1 wherein the means for receiving at least a portion of the user's thigh further comprises:

means for receiving the back of the user's calf; and means for receiving the user's foot.

10. A system as defined in claim 1 further comprising means for changing the mechanical leverage provided by the means for transmitting the extension motion of the user's hip into the rotational movement of the axle.

11. A system as defined in claim 10 wherein the means for changing the mechanical leverage comprises means for altering the effective length of a means for connecting the back of the user's thigh to the eccentric portion of the axle.

\* \* \* \* \*